US008867058B2

(12) United States Patent
Kadowaki

(10) Patent No.: US 8,867,058 B2
(45) Date of Patent: Oct. 21, 2014

(54) IMAGE FORMING APPARATUS AND IMAGE FORMING SYSTEM

(75) Inventor: Seijiro Kadowaki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1344 days.

(21) Appl. No.: 11/930,610

(22) Filed: Oct. 31, 2007

(65) Prior Publication Data
US 2008/0100864 A1 May 1, 2008

(30) Foreign Application Priority Data

Oct. 31, 2006 (JP) ................................ 2006-295962
Oct. 29, 2007 (JP) ................................ 2007-280386

(51) Int. Cl.
G06K 15/00 (2006.01)
G06F 3/12 (2006.01)
G06F 21/60 (2013.01)
H04N 1/32 (2006.01)

(52) U.S. Cl.
CPC .... H04N 1/32101 (2013.01); *H04N 2201/3233* (2013.01); *G06F 21/608* (2013.01)
USPC .......................... 358/1.14; 358/1.15; 358/1.16

(58) Field of Classification Search
USPC ...................................................... 358/1.15
See application file for complete search history.

(56) References Cited

U.S. PATENT DOCUMENTS

| 7,264,411 | B2 * | 9/2007 | Matsunaga et al. | .............. | 400/62 |
| 2005/0055547 | A1 * | 3/2005 | Kawamura | ..................... | 713/155 |
| 2005/0108547 | A1 * | 5/2005 | Sakai | ............................. | 713/182 |
| 2005/0219556 | A1 * | 10/2005 | Lee et al. | ........................ | 358/1.1 |
| 2006/0082805 | A1 * | 4/2006 | Kobayashi et al. | ........... | 358/1.14 |
| 2006/0165456 | A1 | 7/2006 | Matsunaga et al. | | |
| 2006/0271781 | A1 * | 11/2006 | Murakawa | ...................... | 713/168 |
| 2006/0274360 | A1 * | 12/2006 | Fukui et al. | .................... | 358/1.15 |
| 2007/0091346 | A1 * | 4/2007 | Ogura et al. | .................. | 358/1.14 |
| 2008/0068642 | A1 | 3/2008 | Takahashi | | |

FOREIGN PATENT DOCUMENTS

| JP | 2003-131842 | | 5/2003 |
| JP | 2003-345583 | | 12/2003 |
| JP | 2004-168052 | | 6/2004 |
| JP | 2005018741 | A | 1/2005 |
| JP | 2006-209196 | | 8/2006 |
| JP | 2006334870 | A | 12/2006 |
| JP | 2006334873 | A * | 12/2006 |
| WO | 2006049292 | A1 | 5/2006 |

OTHER PUBLICATIONS

Office Action issued on Sep. 20, 2011 in the counterpart Japanese application 2007-280386 (6 pages total).

* cited by examiner

Primary Examiner — Huo Long Chen
(74) Attorney, Agent, or Firm — Banner & Witcoff, Ltd.

(57) ABSTRACT

An image forming apparatus includes: an image forming unit; a storage section that stores a plurality of registration information, each including authentication information and terminal information indicating a terminal corresponding to the authentication information; an input section that inputs authentication information; an acquisition section that acquires registration information including terminal information corresponding to the authentication information inputted by the input section, from the storage section of the image forming apparatus or a storage section of another image forming apparatus; and a controller that receives image data from a terminal indicated by the terminal information included in the registration information acquired by the acquisition section and controls the image forming unit to form an image on a recording medium based on the received image data.

19 Claims, 12 Drawing Sheets

FIG. 2

| REGISTRATION INFORMATION ||
|---|---|
| UNIQUE ID | 123465789012 |
| USER ID | ABCDEF |
| PASSWORD | ***** |
| REGISTERED PC 1 | 192. 168. 234. 120 |
| REGISTERED PC 2 | |
| FREQUENCY OF USE | 15 |

FIG. 3

| GROUP INFORMATION ||||
|---|---|---|---|
| # | ADDRESS | MODEL CODE | AVAILABLE STORAGE CAPACITY FOR REGISTRATION INFORMATION [UIS] |
| 1 | 192. 168. 234. 132 | ABC12345678 | 8,192 |
| 2 | 192. 168. 234. 032 | DEF34567890 | 4,096 |
| 3 | 192. 168. 234. 232 | GHI678901234 | 32,768 |

FIG. 6

| TRANSMISSION REQUEST DATA | | |
|---|---|---|
| USER INFORMATION | USER ID | ABCDEF |
| | PASSWORD | ***** |
| SENDER | 192. 168. 234. 100 | |

| PRINT TRANSMISSION DATA | | |
|---|---|---|
| USER INFORMATION | USER ID | ABCDEF |
| | PASSWORD | ***** |
| PRINT INFORMATION | PRINT DATA | |

IMAGE FORMING APPARATUS AND IMAGE FORMING SYSTEM

CROSS-REFERENCE TO RELATED APPLICATION

This application claims priority from Japanese Patent Application No. 2006-295962, filed on Oct. 31, 2006, and Japanese Patent Application No. 2007-280386, filed on Oct. 29, 2007, the entire subject matter of which is incorporated herein by reference.

TECHNICAL FIELD

Aspects of the present invention relate to an image forming apparatus and an image forming system.

BACKGROUND

In an image forming system including a computer and a printer which are connected together through a network, so-called secure printing is known as a technique to ensure security when image data transmitted from the computer are printed out by the printer. In general secure printing, image data and a password set thereon are first transmitted from a computer to a printer. After a user has entered a password through an operation section of the printer, the image data are printed out when the password has coincided with the transmitted password. However, in such an image forming system, the image data cannot be printed out immediately when the printer to which the user has sent the image data is occupied by another user or faulty.

In contrast, in the image forming system described in JP-A-2003-131842, when secure printing is performed, the computer first sends the image data to all printers (virtual printers) connected to the network. A printer to which a user has entered a valid password prints out the image data. As a result, the user can print out image data from an arbitrary printer.

SUMMARY

However, in the image forming system, the image data are transmitted to all of the printers, and therefore heavy load is imposed on the network. In a situation where a plurality of users perform secure printing, each of the printers have to be provided with large storage memory for storing image data.

The following configuration is conceivable to solve the above situation. That is, image data transmitted from a computer are temporarily stored in a server computer and the server computer transmits image data only to a printer, into which a valid password has been inputted, and causes the printer to print out the image data. However, this configuration requires installation of the server computer in the network, and therefore, this configuration cannot be adopted in some situations.

Aspects of the present invention relate to above-problem. According to at least one aspect of the present invention, an image forming apparatus and an image forming system may be provided, which enable to reduce the load imposed on a network and reduce the amount of usage of storage when transmission and receipt of image data are performed with authentication.

According to an aspect of the present invention, an image forming apparatus including a communication section that communicates with another image forming apparatus and a plurality of terminals; an image forming unit; a storage section that stores a plurality of registration information, each including authentication information and terminal information indicating a terminal corresponding to the authentication information; an input section that inputs authentication information; an acquisition section that acquires registration information including terminal information corresponding to the authentication information inputted by the input section, from the storage section of the image forming apparatus or a storage section of the other image forming apparatus; and a controller that receives image data from a terminal indicated by the terminal information included in the registration information acquired by the acquisition section and controls the image forming unit to form an image on a recording medium based on the received image data.

BRIEF DESCRIPTION OF THE DRAWINGS

In the accompanying drawings:

FIG. 2 is a view for describing the content of registration information;

FIG. 3 is a view for describing the content of group information;

FIG. 6 is a view for describing the content of transmission request data;

DETAILED DESCRIPTION

An embodiment of the present invention will now be described with reference to FIGS. 1 through 14.

[Overall Configuration of Image Forming System]

Figure 1:
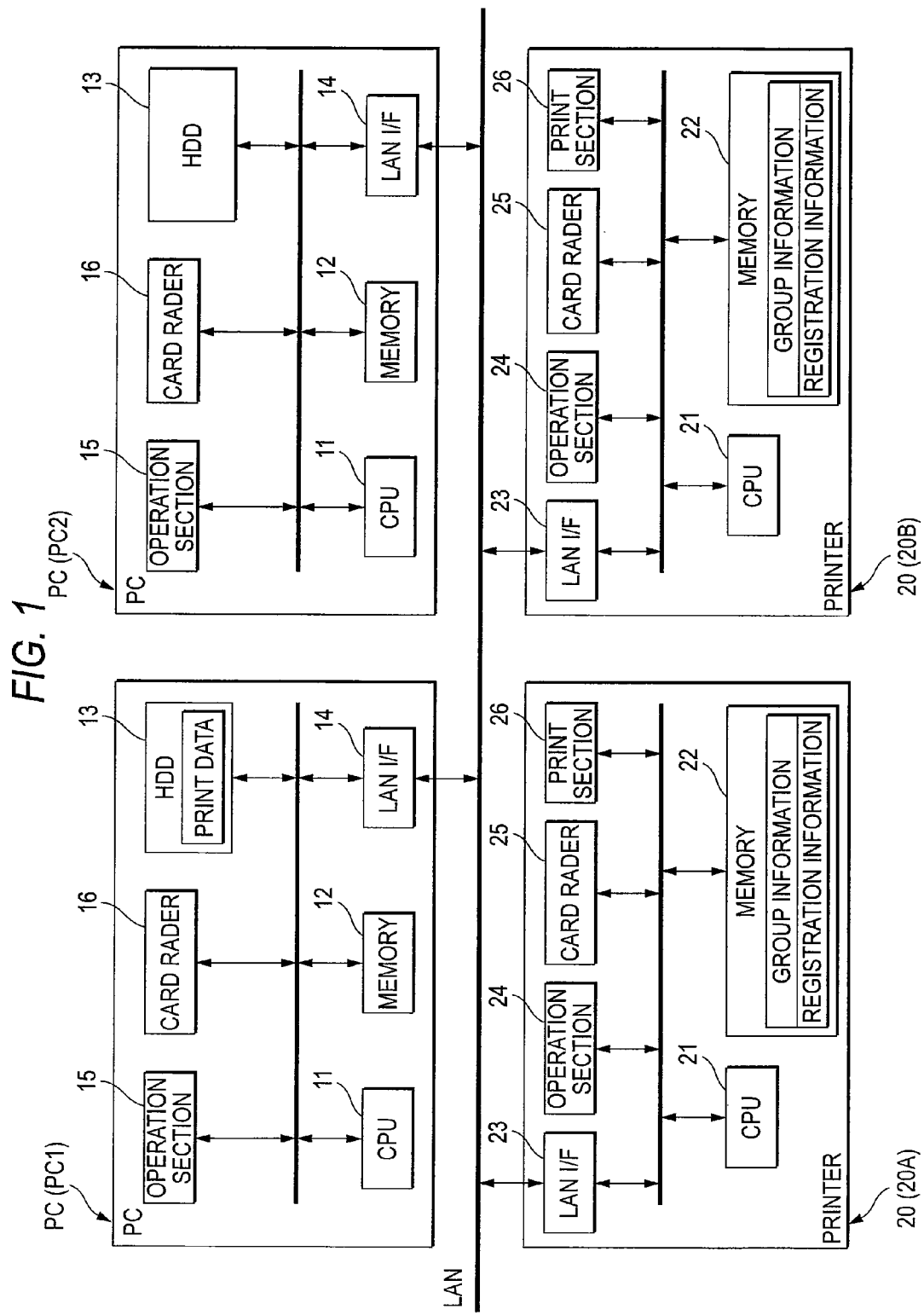
FIG. 1 is a block diagram showing the overall configuration of an image forming system according to an embodiment of the present invention.
Figure 4:
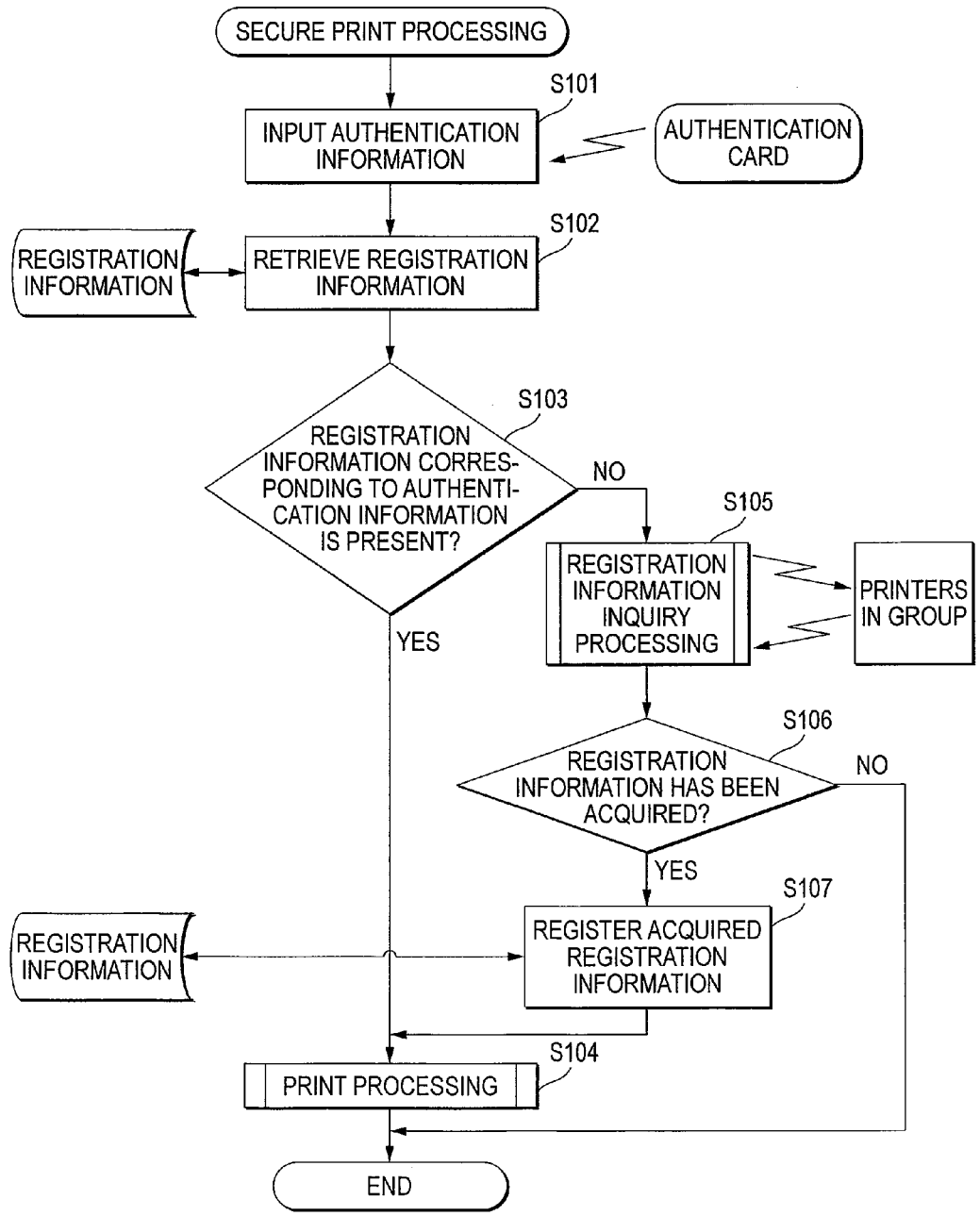
FIG. 4 is a flowchart showing the flow of secure print main processing.

FIG. 1 is a block diagram showing the general configuration of an image forming system of an embodiment. As illustrated, this image forming system includes a plurality of computers PC serving as terminals and a plurality of printers 20 serving as image forming apparatuses which are connected together through a LAN. Although FIG. 1 shows only two computers and two printers, the image forming system may also be configured such that three or more computers and three or more printers are connected. When a single computer and a single printer are described as distinguished from the other computer and the other printer, the computers and the printers are specified by suffixing reference numerals or symbols to the PCs and the printers, just like PC 1 and PC 2 or 20A and 20B.

The printer 20 includes; a CPU 21 serving as an acquisition section, a controller, an storage management section, or an update section; a memory 22 serving as a storage section; a network interface 23 serving as a communication section; an operation section 24 which receives input of key operation; a card reader 25 serving as an input section which reads an authentication card; a print section 26 serving as an image forming section, and the like. In more detail, the memory 22 includes ROM, RAM, and nonvolatile memory. Various programs used for controlling the overall printer 20 are recorded in the ROM of the memory. The LAN is connected to the network interface 23, to thus become able to communicate with the computer PCs and the other printer 20. The print section 26 prints, on an unillustrated sheet serving as a recording medium, an image in accordance with print data (image data).

[Registration Information]

The memory 22 may be a nonvolatile memory and the memory 22 of each of the printers 20 can store a plurality of pieces of registration information. The registration information is used when various types of processing operations pertaining to secure printing to be described later are performed. Regularly, one piece of registration information is used for one user. Combinations and the number of pieces of registration information to be stored in the memory devices 22 of the respective printers 20 are not always same among the printers 20.

As shown in FIG. 2, the registration information includes data pertaining to a unique ID, a user ID, a password, a registration computer, and frequency of use. The unique ID is an authentication number registered for each individual user. Herein, the unique ID is an ID number recorded in an authentication card owned individually by the user. The user ID and the password are individually registered by the user. In the present embodiment, the user ID and the password are identical with a user ID and a password which are used when the user logs in a computer PC in to the network. In the following descriptions, the user ID and the user password are referred to user information in combination.

The registration computer indicates address information of a computer PC which is used as a print data sender by the user when secure printing is performed. One or two pieces of address information are registered in the respective pieces of registration information. The frequency of use is computed from history information stored in the memory 22 of the printer 20. The frequency of use shows the number of times secure printing performed using the registration information among forty secure printing operations performed in the past by the printer 20. Note that the number of times referred to for computing the frequency of use is not limited to forty, larger number or smaller number may be applicable.

[Group Information]

In this system, printers capable of transmitting and receiving the registration information at the time of performing secure printing can be registered as a group. Group information about a group to which the printer 20 belongs is stored in the memory 22 of each printer 20. As shown in FIG. 3, the group information includes a plurality of pieces of printer information of printers 20 belonging to that group. Each of pieces of the printer information includes information about an address of the printer 20 in the network, a model code, available storage capacity in the memory 22 (which is specifically nonvolatile memory) capable of storing registration information (herein after called simply "available capacity of the memory 22"), and a printer number sequentially assigned from one to the respective printers belonging to the group. As will be described later, this group information is synchronized successively so that the same content are stored in the respective printers 20 in the group.

When information including user information, registration information, and group information is transmitted from the printer 20 or the computer PC through the network interface 14 or 23, the information is encrypted through each of processing operations provided below under control of the CPU 11 or the CPU 21. The printer 20 or the computer PC which has received the encrypted information decrypts the encrypted information under control of the CPU 11 or the CPU 21.

[Main Processing of Secure Printing]

When the computer PC 1 performs secure printing, the user first activates a predetermined program in the computer PC 1 through key operation performed in the operation section 15; specifies data which are to be printed; and inputs a secure print command for performing secure printing. As a result, the CPU 11 generates print data (image data) from the specified data and spools (temporarily stores) the print data into a hard disk drive 13. Meanwhile, when the computer PC 1 starts, the CPU 11 starts print data transmission processing, which will be described later, and waits for transmission request data transmitted from the printer 20.

Next, the user moves to a location where any one of the printers 20 (the printer 20A in this case) in the network is installed and instructs execution of secure printing through key operation performed in the operation section 24. As a result, the CPU 21 initiates secure print processing indicated by a flowchart shown in FIG. 4. At first, the user causes a card reader 25 to read user's authentication card and the ID number recorded in the authentication card is inputted as authentication information (a unique ID) about the user (S101).

Subsequently, the CPU 21 retrieves, from the pieces of registration information stored in the memory 22, a piece of registration information corresponding to the inputted authentication information (S102). When the piece of registration information corresponding to the inputted authentication information (a unique ID) is present (Yes in S103), print processing to be described later is performed in accordance with the piece of registration information (S104). When the piece of registration information corresponding to the inputted authentication information (a unique ID) is not present (No in S103), registration information inquiry processing, which will be described later, is performed (S105). During inquiry processing, an inquiry about registration information corresponding to the inputted authentication information is sent to the other printer 20B belonging to the same group to which the printer 20A belongs. When registration information corresponding to the inputted authentication information is acquired (Yes in S106), the thus-acquired registration information is stored in the memory 22 (S107). Subsequently, in S104, the print processing is performed in accordance with the registration information. When the registration information cannot be acquired (No in S106), this main processing operation is terminated without performing the print processing. Note that the secure print processing indicated by the flow chart shown in FIG. 4 may be initiated not by the instruction through key operation performed in the operation section 24 by a user, but by putting the authentication card above the card reader 25 so that the card reader 25 reads the ID number recorded in the authentication card.

[Print Processing and Print Data Transmission Processing]

Figure 5:
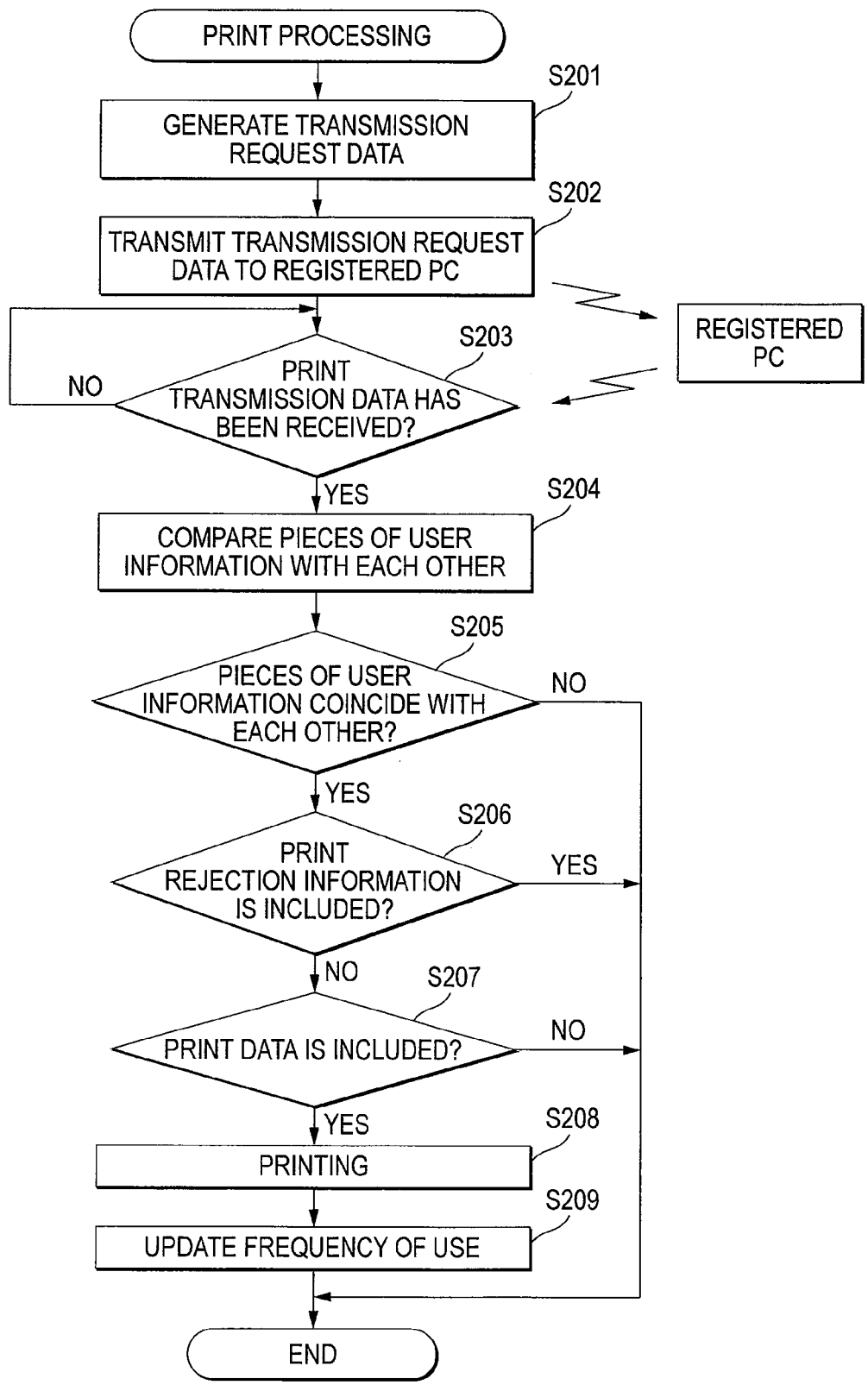
FIG. 5 is a flowchart showing the flow of print processing.

Upon initiating the print processing shown in FIG. 5, the CPU 21 generates transmission request data (an image data transmission request signal) in accordance with the acquired registration information (S201). As shown in FIG. 6, the transmission request data includes user information (a user ID and a user password) included in the registration information and an address of the printer 20A that is the sender. The thus-generated transmission request data are transmitted to addresses of all registration computers included in the registration information (S202). Subsequently, print transmission data transmitted from the computer PC is awaited (S203).

Figure 7:
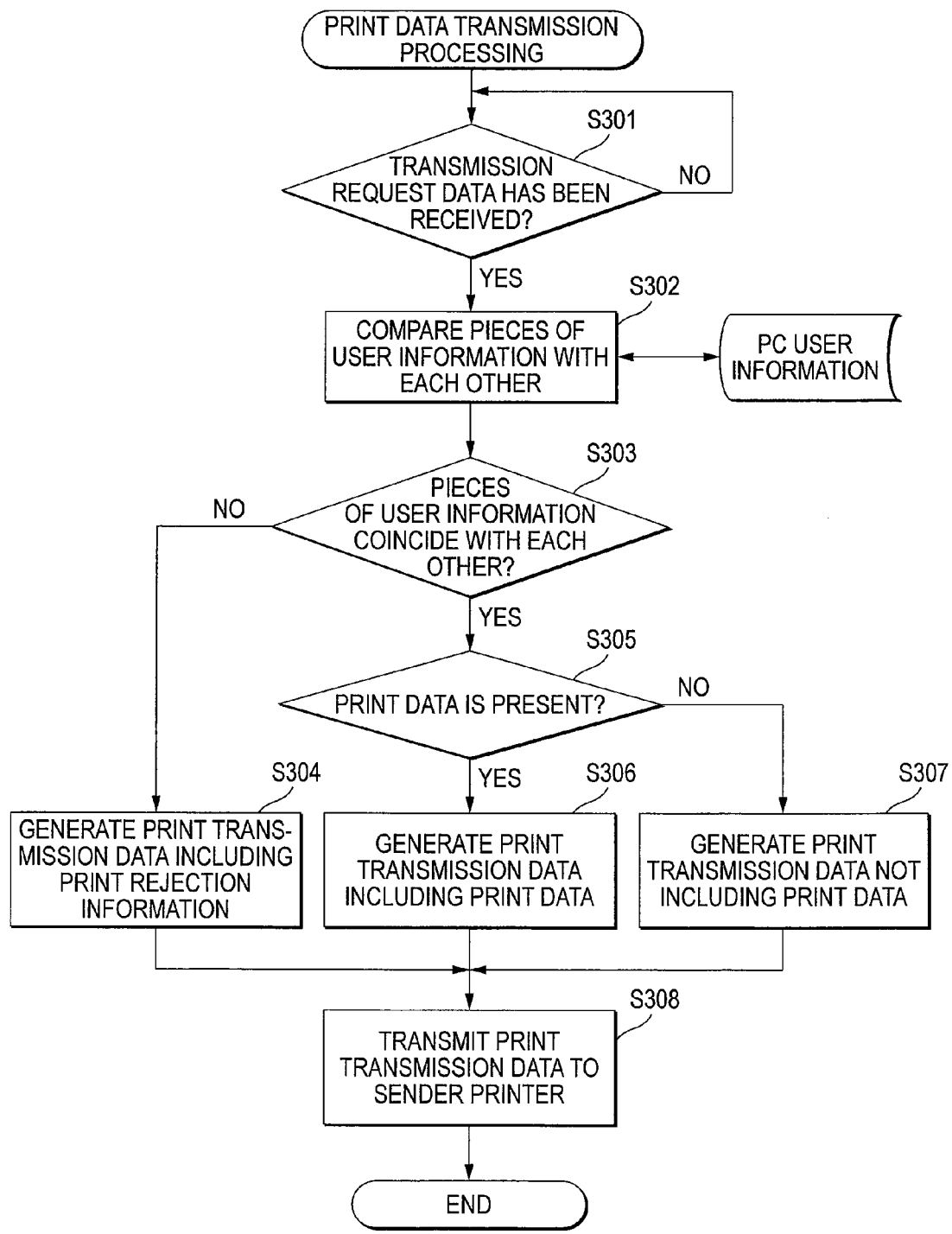
FIG. 7 is a flowchart showing the flow of print data transmission processing.

Meanwhile, as mentioned previously, print data transmission processing shown in FIG. 7 is being performed in the computer PC, which has been started by a user. During print data transmission processing, the CPU 11 awaits transmission of transmission request data from the printer 20 (S301). Upon receipt of the transmission request data (Yes in S301), the CPU 11 compares the user information included in the transmission request data with the user information about the user who has logged in the computer PC 1 at that time (S302).

Figures 8, 9:
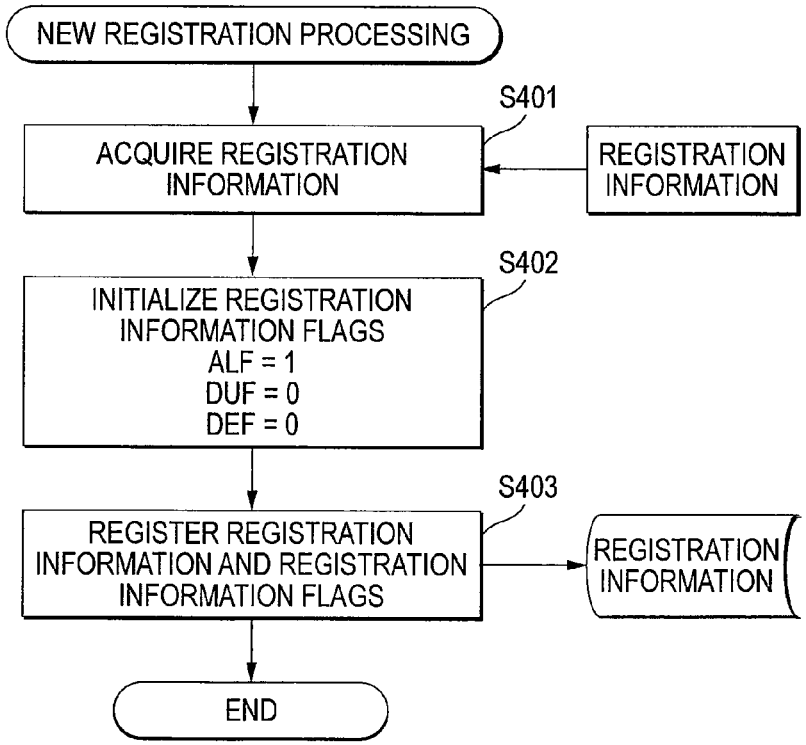
FIG. 8 is a view for describing the content of print transmission data.
FIG. 9 is a flowchart showing the flow of new registration processing.

When these pieces of user information do not coincide with each other (No in S303), print transmission data including print rejection information is generated (S304). When these pieces of user information coincide with each other (Yes in S303), it is determined whether or not the print data are stored in the hard disk drive 13 (S305). When print data are stored (Yes in S305), the print transmission data including the print data and the user information is generated (S306), as shown in FIG. 8. When print data is not stored (No in S305), print transmission data not including print data is generated (S307). After print transmission data have been generated in any of steps S304, S306, and S307, the print transmission data are transmitted to the printer 20A of the sender of the transmission request data (S308), and transmission processing pertaining to the print data returns to S301.

As shown in FIG. 5, upon receipt of the print transmission data from the computer PC 1 (Yes in S203), the printer 20A compares the user information included in the print transmission data with the user information included in the acquired registration information (S204). When these pieces of user information do not coincide with each other (No in S205), print processing is terminated without performing printing. When these pieces of user information coincide with each other (Yes in S205), it is determined whether or not print rejection information is included in the print transmission data (S206). When the print rejection information is included (Yes in S206), print processing is terminated. When the print rejection information is not included (No in S206), it is determined whether or not print data are included in the print transmission data (S207). When print data are not included (No in S207), print processing is terminated. When print data are included (Yes in S207), the print data are sent to the print section 26, and the print section 26 prints on a sheet an image in accordance with the print data (S208). Subsequently, the CPU 21 updates the history of secure printing stored in the memory 22 of the printer 20A, as well as updating the frequency of use of each of the pieces of registration information (S209) and the print processing is completed.

[New Registration Processing]

There will now be described new registration processing performed by the printer 20 when new registration information, which has not yet been registered in any of the printers 20 in the group, is registered in any of the printers 20. First, the user activates a predetermined program in any of the computers PC, to thus transmit a registration request including the content of new registration information (i.e., a unique ID, user information, and a computer to be registered) to any one of the printers 20 (the printer 20B in this case) in the group. Upon receipt of the registration request, the printer 20B starts new registration processing shown in FIG. 9 and acquires the content of the registration information included in the registration request (S401). The user may also input the content of new registration information directly into the printer 20 through the operation section 24 or the card reader 25.

A set of registration information flags is registered in the memory 22 (nonvolatile memory) of each printer 20 for each of the pieces of the registration information stored therein. The set of registered information flags is associated with each of the pieces of the registration information. The registration information flag set includes three flags; namely, an ALF (Alone Flag), a DUF (Dual Flag), and a DEF (Delete Flag). Any one of these three flags assumes a value of one, and the other two flags assume a value of zero at all times. ALF=1 shows that registration information assigned this flag is stored in only one printer 20 in the group. DUF=1 shows that same registration information as the registration information assigned this flag is stored in at least two printers 20 in the group. DEF=1 shows that same registration information as the registration information assigned this flag is stored in three or more printers 20 in the group. Note that "same registration information" herein means that, in the registration information shown in FIG. 2, the unique ID, the user ID, the password, and the registration computer are same with each other. And the frequency of use is not necessarily same with each other.

After acquiring new registration information in S401, the CPU 21 initializes a registration information flag corresponding to the new registration information; namely, sets the flags, just as ALF=1, DUF=0, and DEF=0 (S402). The registration information and a registration information flags thereof are stored in the memory 22 (S403). The frequency of use of the new registration information to be newly stored is set to 0.

[Registration Information Inquiry Processing and Inquiry Response Processing]

There will now be described registration information inquiry processing (S105 in FIG. 4) which is performed during secure print main processing when registration information corresponding to the authentication information inputted to the memory 22 of the printer 20 is not present.

Figure 10:
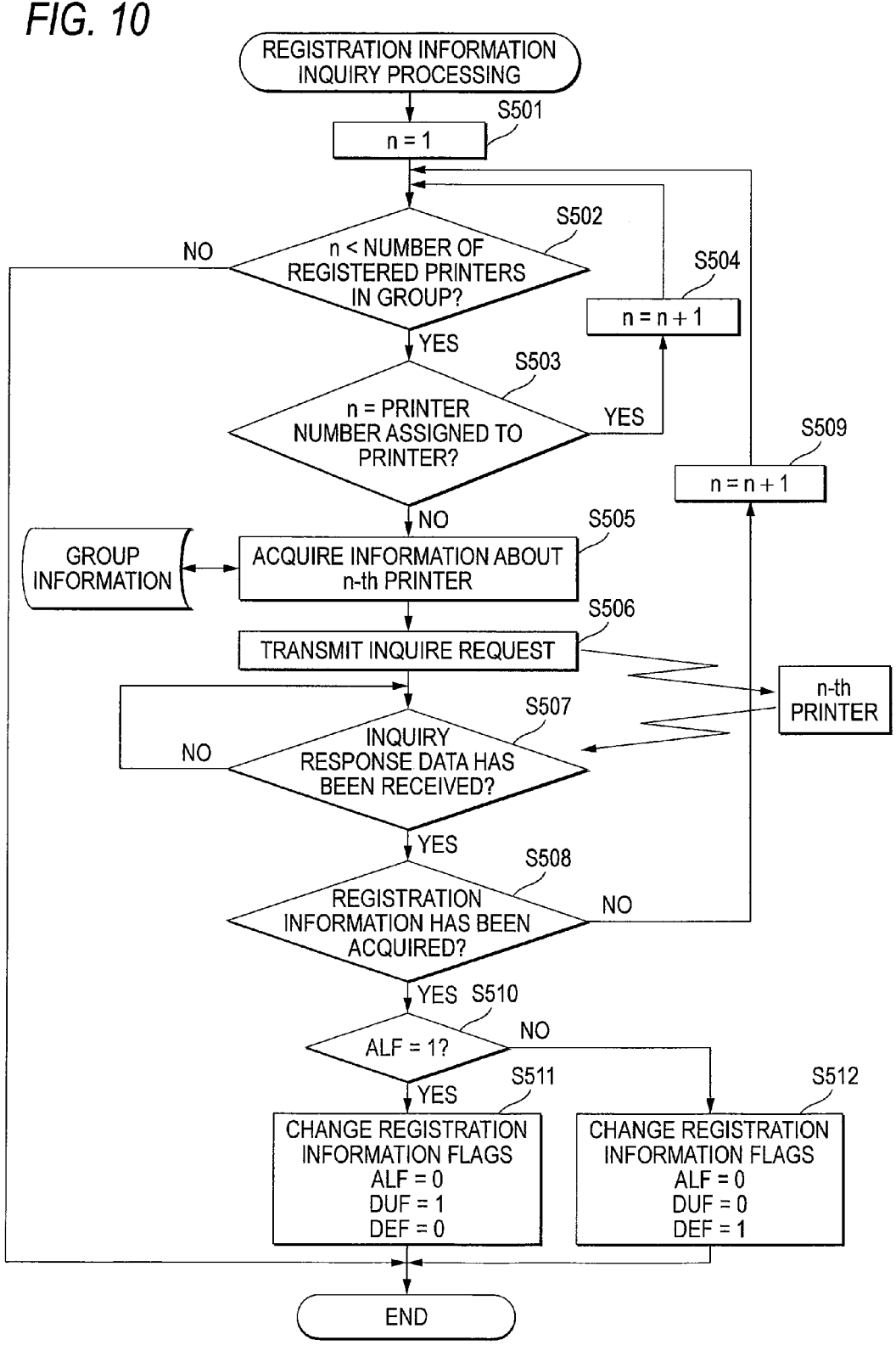
FIG. 10 is a flowchart showing the flow of registration information inquiry processing.

When initiating registration information inquiry processing shown in FIG. 10, the CPU 21 first sets a counter "n" to one (S501). Subsequently, the CPU determines whether or not the counter "n" is smaller than the number of all of the printers registered in the group information (S502). When the counter "n" does not come to the total number of printers (Yes in S502), it is determined whether or not "n" designates a printer number assigned to the printer 20, which performs the registration information inquiry processing, in the group information (S503). When "n" designates a printer number assigned to the printer 20, one is added to "n" (S504), and processing returns to S502. When "n" does not designate the printer number assigned to the printer 20 (No in S503), printer information associated with printer number "n" is acquired from the group information shown in FIG. 3 (S505). An inquiry request is transmitted to an address of the printer information (the address of the printer 20B in this case) (S506). This inquiry request includes the inputted authentication information and an address of the printer that serves as the sender.

Figure 11:
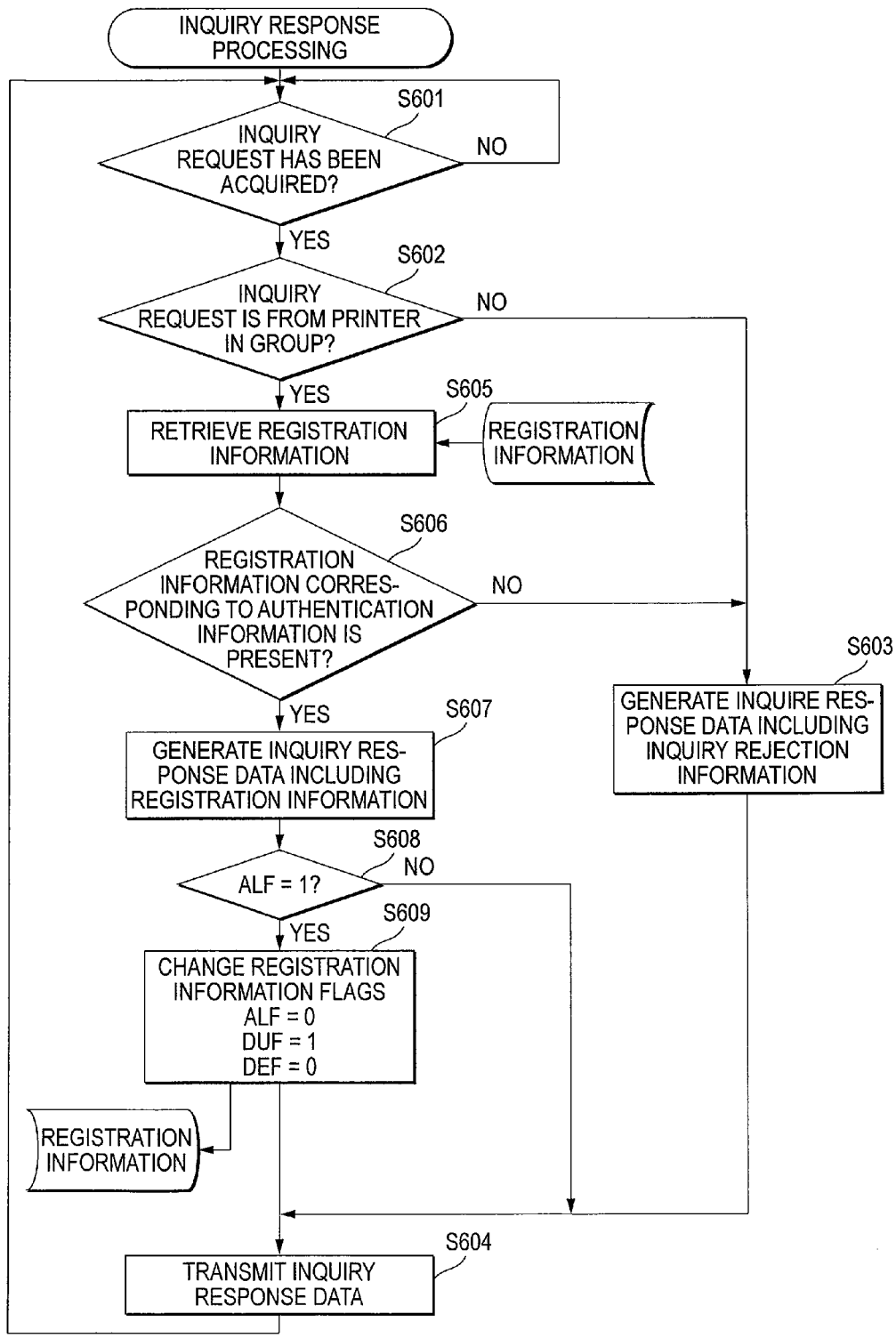
FIG. 11 is a flowchart showing the flow of inquiry response processing.

Inquiry response processing which is performed by each printer 20 for a response to the inquiry request will be described. As shown in FIG. 11, the printer 20B that is the destination of the inquiry request waits for an inquiry request (S601). Upon receipt of the inquiry request (Yes in S601), the printer 20B determines whether or not the printer 20A that is the sender of the inquiry request is registered in the group information (S602). When the printer 20A is not registered in the group information (No in S602), inquiry response data including inquiry rejection information is generated (S603). After the inquiry response data have been transmitted to the printer 20A (S604), the processing returns to S601.

When the printer 20A that is the sender of the inquiry request is registered in the group information (Yes in S602), registration information corresponding to the authentication information included in the inquiry request is retrieved (S605) When registration information corresponding to the authentication information is not present (No in S606), processing proceeds to S603, and inquiry response data including the inquiry rejection information is generated, and subsequently the inquiry response data is transmitted to the sender printer 20A (S604).

When the registration information corresponding to the authentication information is present in the memory 22 of the printer 202, which received the inquiry request (Yes in S606), inquiry response data including the registration information and the registration information flag corresponding to the registration information is generated (S607). When the registration information flag is ALF=1 (Yes in S60), the registration information flags of the registration information stored in the memory 22 of the printer 20B are changed to ALF=0, DUF=1 and DEF=0 (S609). When the registration information flag is not ALF=1 (i.e., in the case of DUF=1 or DEF=1; namely, No in S608), the registration information flags of the registration information stored in the memory 22 of the printer 203 are not changed. Subsequently, the thus-generated inquiry response data is transmitted to the sender printer 20A (S604), and processing returns to S601.

In the meantime, as shown in FIG. 10, the printer 20A which transmitted the inquiry request afterwards waits for receipt of inquiry response data (S507). Upon receipt of the inquiry response data (Yes in S507), the printer 20A determines whether or not the inquiry response data include registration information (S508). When registration information is not included in the inquiry response data (No in S508), one is added to the counter "n" (S509), and processing returns to S502. Specifically, when the inquiry response data including registration information are not received, processing pertaining to S502 to S509 is iterated, thereby sequentially transmitting an inquiry request to the other printers 20 registered in the group information. When inquiry response data including registration information are not received from any of the printers 20 registered in the group information, processing proceeds to S502, where inquiry processing pertaining to this registration information is terminated (No in S502).

When registration information is included in the inquiry response data (Yes in S508), it is determined whether or not the registration flag is ALF=1 (S510). When the registration flag is ALF=1 (Yes in S510), the registration flags are changed to ALF=0, DUF=1 and DEF=0 (S511). When the registration flag is not ALF=1 (i.e., in the case of DUF=1 or DEF=1; namely, No in S510), the registration information flag is set to ALF=0, DUF=0, DEF=(S512). The reason for this is that the number of locations (printers) in the group where the registration information is stored increases by one during secure print main processing (S107 in FIG. 4). Subsequently, inquiry processing pertaining to the registration information is terminated. As mentioned previously, the registration information acquired from the other printer 20B through inquiry processing is stored in the memory 22 of the printer 20A (S107 shown in FIG. 4).

[Group Information Synchronization Processing]

Group information synchronization processing executed in order to synchronize pieces of group information stored in the printers 20 will now be described. When group information is newly registered in the printers 20, the user executes a predetermined program in any of the computers PC connected to the network, whereby group update information including a portion or the entirety of new group information is transmitted to any one of the printers 20 belonging to the group under control of the CPU 11.

The group update information is periodically transmitted from one printer 20 to another printer 20 in the group. The group update information is also transmitted during the course of group update information processing, as described below. When a change has arisen in the available storage capacity of the memory 22 (nonvolatile memory) of one of the printer 20, as in the case where new registration information is registered, printer information about the printer 20 in the group information is updated, and group update information including that printer information is transmitted to another printer 20 in the group.

Figure 12:
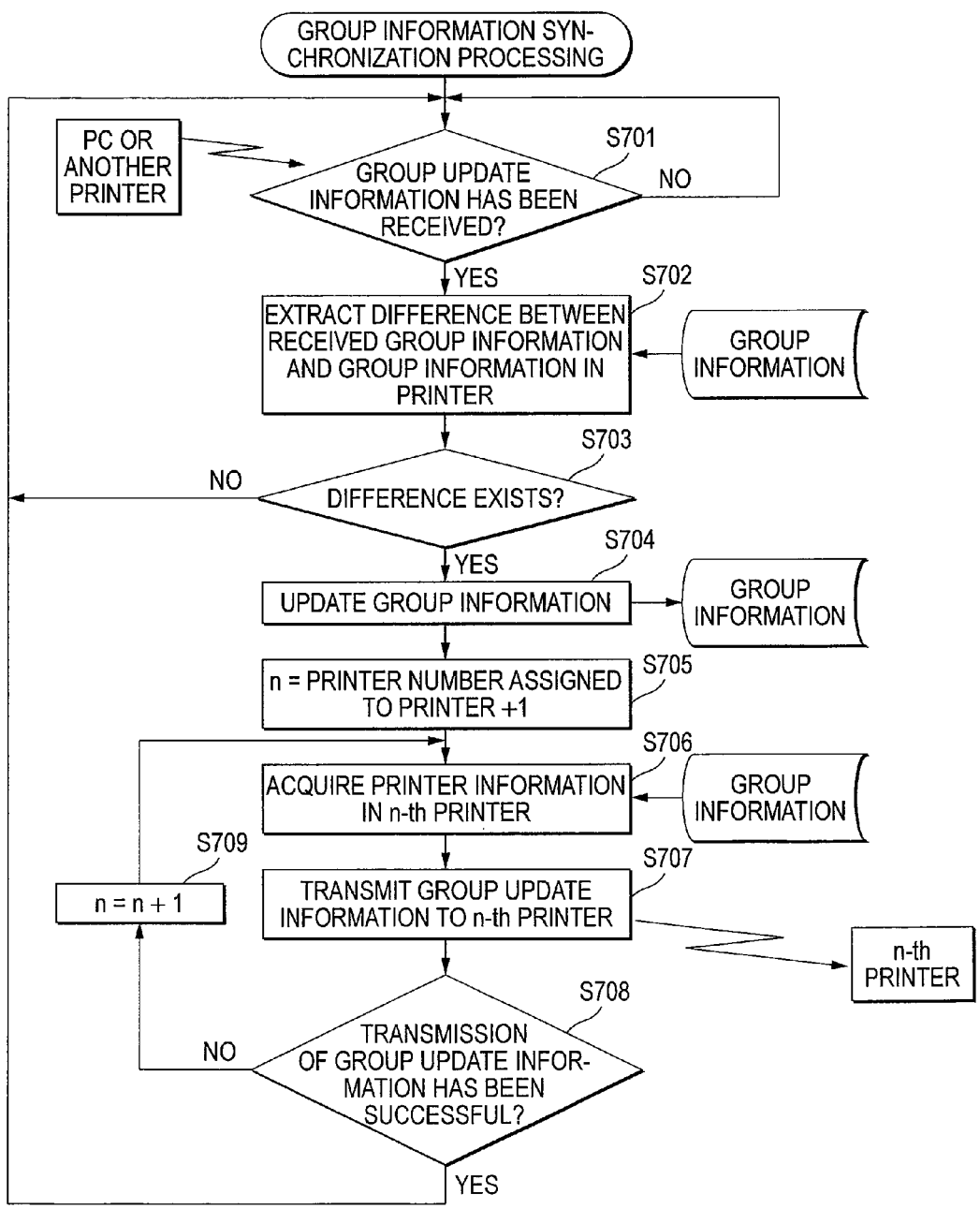
FIG. 12 is a flowchart showing the flow of group information synchronization processing.
Figure 13:
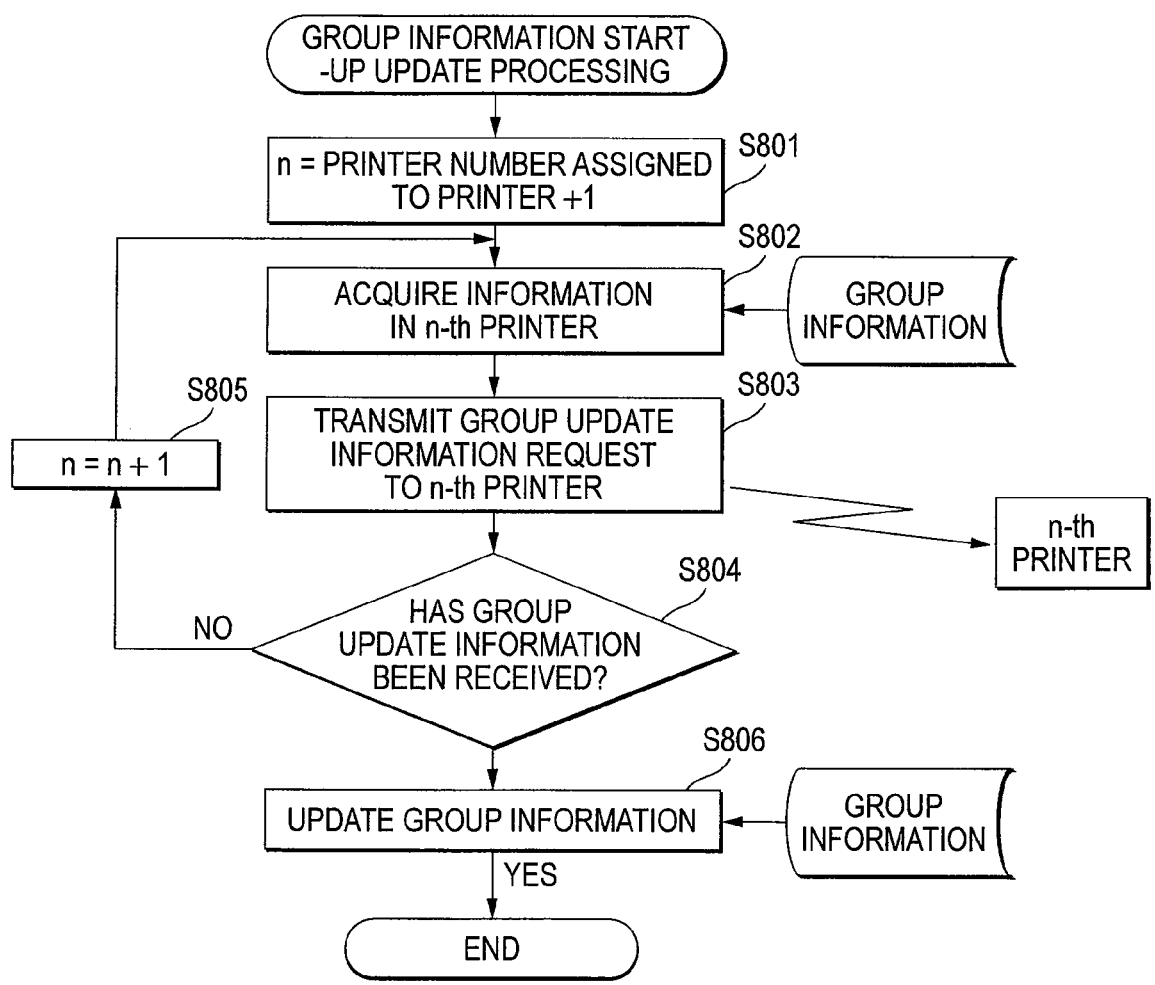
FIG. 13 is a flowchart showing the flow of group information start-up update processing.

As shown in FIG. 12, each of the printer 20 waits for group update information transmitted from the computer PC or another printer 20 during group information synchronization processing (S701). When group update information has been received (Yes in S701), a difference between the content of group information included in the received group update information and the content of the group information stored in the memory 22 of the printer 20, which received the group update information (S702). When no difference exists between these pieces of the group information (No in S703), processing returns to S701.

When a difference exists between these pieces of the group information (Yes in S703), the content of the group information stored in the memory 22 are updated in accordance with the content of the group update information (S704). Next, the counter "n" is set to a value which is a result of addition of one to the printer number assigned to the printer 20, which received the group update information, in the group information (S705). When the value resulting from addition of one to the printer number assigned to the printer 20 exceeds the printer number registered in the group information, the counter is set to n=1. Printer information corresponding to the printer number "n" is acquired from the group information (S706), and group update information including the update group information is transmitted to the printer 20 assigned the printer number "n" (S707). When transmission of the group update information has become successful (Yes in S708), processing returns to S701. Further, when transmission of the group update information has ended in a failure as in the case of power-off of the printer 20 that is a destination of transmission (No in S708), one is added to the counter "n" (S709), and processing returns to S706. The group update information is transmitted to the printer assigned the next printer number. When in S708 the value obtained by adding one to the counter, "n" has exceeded the number of printers registered in the group information, the counter is set to n=1.

In a preceding printer to which the group update information has been transmitted in S707, group information synchronization processing is performed similarly. Hence, when a difference exists between the group information included in the received group update information and the group information stored in the printer 20, which received the group update information, the group information stored in the printer 20 is updated, and the content of the update group information are transmitted, as group update information, to the printer assigned the next printer number.

[Group Information Start-Up Update Processing]

Group information start-up update processing to be performed at power-on of the printer 20 will now be described. When the power of the printer 20 is turned on, the CPU 21 of the printer first sets the counter "n" to a value obtained by adding one to the printer number assigned to the printer 20 (S801). When the value obtained by adding one to the printer number assigned to the printer 20 exceeds the number of printers registered in the group information, the counter is set to n=1. Printer information corresponding to the printer number "n" is acquired from the group information (S802), and a group update information request for requesting transmission of group update information is transmitted to the printer 20 (S803).

The printer which has received the group update information request transmits, to the sender printer, the group update information including the group information stored in the memory 22 of this printer. Upon receipt of the group update information (Yes in S804), the sender printer updates group information (S806) and terminates the group information start-up update processing. When the group update information is received, the contents of the group information stored in the memory 22 of the printer 20 which receives the group update information are synchronized with the contents of the group information included in the received group update information. When receipt of the group update information has ended in a failure (No in S804), one is added to the counter "n" (S505), and processing returns to S802, where a group update information request is transmitted to a printer assigned the next printer number. When even in S805 the value determined by adding of one to the counter "n" exceeds the number of printers registered in the group information, the counter is set to n=1.

[Capacity Ensuring Processing]

Figure 14:
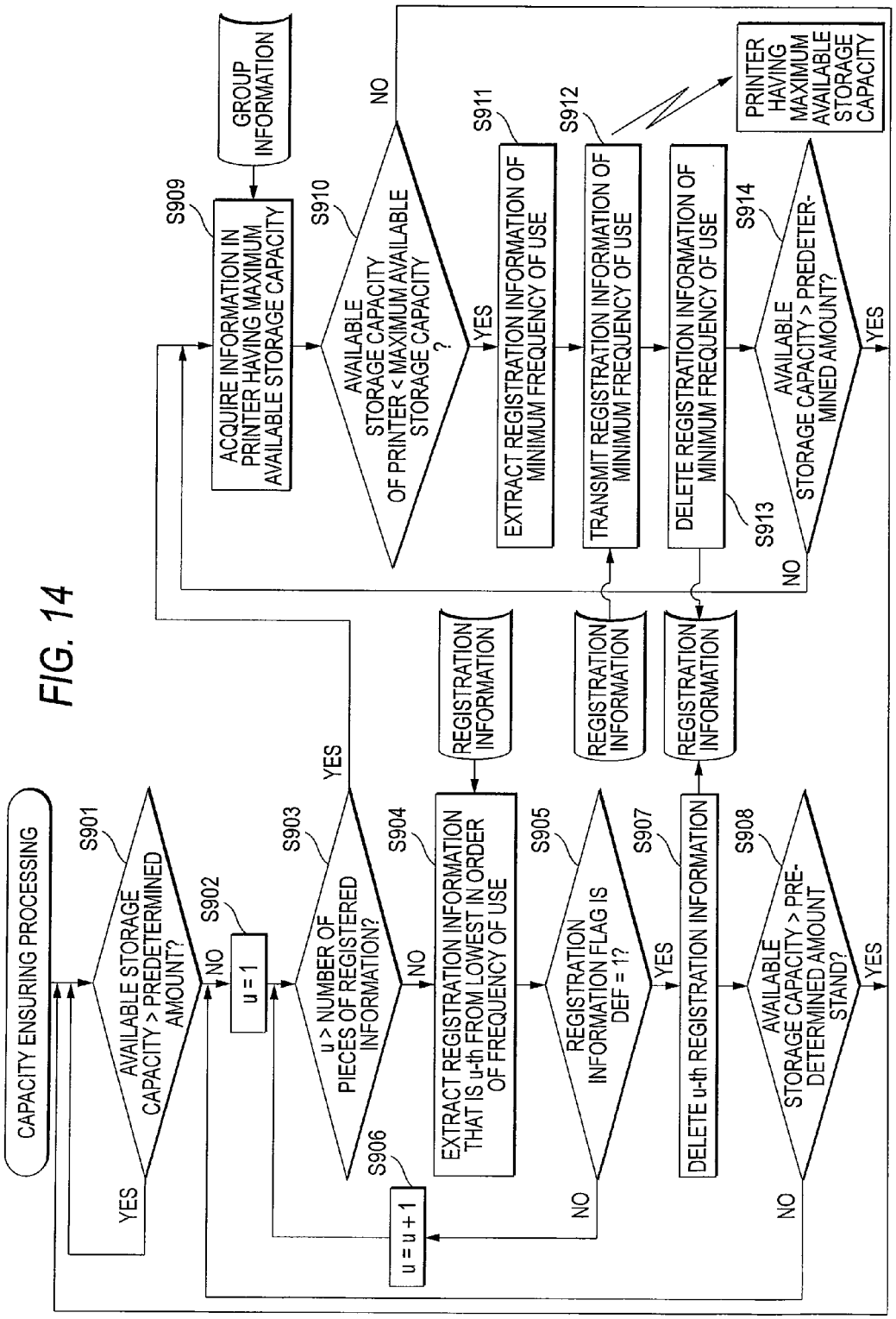
FIG. 14 is a flowchart showing the flow of capacity ensuring processing.

Capacity ensuring processing performed in order to ensure the amount of available storage capacity in the memory 22 in each printer 20 will now be described. As shown in FIG. 14, when capacity ensuring processing is initiated, the CPU 21 periodically checks whether or not the available storage capacity of the memory 22; namely, the available storage capacity of an area in nonvolatile memory used for storing registration information is equal to or greater than a predetermined amount (S901). When the available storage capacity is smaller than the predetermined amount (No in S901), the counter "u" is set to one (S902). Subsequently, it is determined whether or not the value of the count "u" is greater than the number of pieces of registration information stored in the memory 22 (S903).

When the value of the count "u" has not reached the number of pieces of registration information (No in S903), the registration information that is the u-th from the lowest in the order of frequency of use is extracted from the pieces of the registration information stored in the memory 22 (S904). When the registration information flag of the extracted registration information is not DEF=1 (i.e., the number of locations (printers) where registration information is stored is one or two: No in S905), one is added to the counter "u" (S906), and processing returns to S903. When the registration information flag is DEF=1 (i.e., the number of locations (printer) where registration information is stored is three or more: i.e., Yes in S905), the registration information and a corresponding registration information flag are deleted from the memory 22 (S907). When the available storage capacity is greater than the predetermined amount (Yes in S908), processing returns to S901. When the available storage capacity is equal to or smaller than the predetermined amount (No in S908), processing returns to S902.

When all of the pieces of registration information whose registration information flag is DEF=1 among the pieces of registration information stored in the memory 22 are deleted through foregoing processing and when the available storage capacity does not reach the predetermined amount, Yes is selected in S903 and printer information about a printer including the largest available storage capacity (the maximum storage capacity) is acquired from the group information (S909). Subsequently, it is determined whether or not the available storage capacity of the memory of the printer 20, which performs the capacity ensuring processing, is smaller than the maximum available storage capacity (S910). When the available storage capacity of the printer 20 is not smaller than the maximum available storage capacity (that is, when the available storage capacity of the printer 20 is the maximum: No in S910), processing returns to S901.

When the available storage capacity of the printer 20 is smaller than the maximum available storage capacity (Yes in S910), registration information having the minimum frequency of use (the minimum frequency of use) is extracted from the pieces of registration information in the memory 22 (S911). After the registration information and a corresponding registration information flag have been transmitted to the printer 20 having the maximum available storage capacity, the registration information and the registration information flag are deleted from the memory 22 of the printer 20 (S913). Upon receipt of the registration information and the registration information flag, the printer 20 having the maximum available storage capacity stores the thus-received registration information and the registration information flag in the memory 22. Subsequently, it is determined whether or not the available storage capacity is greater than the predetermined amount (S914). When the available storage capacity is equal to or smaller than the predetermined amount (No in S914), processing returns to S909. When the available storage capacity is greater than the predetermined amount (Yes in S911), processing returns to S901. When the available storage capacity does not reach the predetermined amount even after deletion of all of the pieces of registration information whose registration information flag is DEF=1, a portion or all pieces of the remaining registration information are relocated to another printer 20 having the maximum available storage capacity. As a result, the available storage capacity of the memory 22 can be ensured.

Effects of the Embodiment

As mentioned above, according to the present embodiment, registration information including authentication information (a unique ID) and an address of a computer PC corresponding thereto (terminal information) is stored in the memory 22 of the printer 20. When authentication information is inputted, print data are received from a computer PC corresponding to the inputted authentication information in accordance with the registration information. Consequently, the printer 20 convenient to the user can perform secure printing. Moreover, since print data are exchanged between only specific computers PC, the load imposed on the network can be reduced and the amount of use of the memory 22 of each printer 20 can be reduced as compared with the case where image data are transmitted from the computer PC to all of the printers 20.

Even when the registration information corresponding to the authentication information is not registered in the printer 20, the registration information can be acquired from another printer 20. Therefore, efforts required to perform the registration information into all of the printers 20 can be saved.

Since the registration information acquired from another printer 20 is stored in the memory 22 of printer 20, which acquired the registration information, processing can be performed at high speed when the registration information is acquired next time.

Since the registration information which is low in order of frequency of use is deleted from the memory 22, the amount of use of the memory 22 can be curtailed.

When the available storage capacity of the memory 22 has become tight, the available storage capacity of that memory 22 can be ensured by relocating stored registration information to another printer 20 having a sufficient storage capacity.

Since the same registration information is stored in the plurality of printers 20, few problems arise even when the registration information cannot be extracted for reasons of power-off, a failure, or the like, of one printer.

Since the registration information exchanged among the printers 20 is encrypted, the degree of security is enhanced.

Since the registration information is exchanged individually among registered printers 20, high security is achieved.

Since the pieces of group information stored in the printers 20 are periodically synchronized, labor required to update the group information in each of the printers 20 can be saved.

Since the group information exchanged among the printers 20 is encrypted, security is enhanced.

Upon receipt of a secure print command, the computer PC temporarily stores print data (image data) to be printed into the hard disk drive 13. The printer 20 transmits transmission request data to the computer PC corresponding to the inputted authentication information. Upon receipt of the transmission request data from the printer 20, the computer PC transmits the print data stored in the hard disk drive 13 to the sender printer 20. Upon receipt of the print data, the sender printer 20 prints an image in accordance with the print data. Thus, when secure printing is performed, print data are temporarily stored in the hard disk drive 13 of the computer PC, whereby the load imposed on the network is lessened, and the amount of use of the memory 22 of the printer 20 can be curtailed.

Other Embodiments

The present invention is not limited to the embodiment described above with reference to the drawings. For example, the following embodiment may also fall within the technical scope of the present invention.

(1) In the present embodiment, the authentication card is used as means for inputting authentication information. However, for example, the user may enter a password in an operation section.

(2) When the printer is provided with a medium connection section for connecting a storage medium (a USB and the like) and when registration information and group information are updated, the information stored in the storage medium connected to the medium connection section may be read.

(3) The present invention can also be applied to; for example, a multifunction machine equipped with a scanner section for reading an original image. In this case, for example, the image forming system may also be configured such that, when an original image is read by the scanner section, the user causes the multifunction machine to read an authentication card with the card reader, to thus acquire registration information corresponding to the authentication information; and transmits image data acquired from the scanner section to a registered computer included in the registration information.

What is claimed is:

1. An image forming apparatus comprising:
a communication interface configured to communicate with another image forming apparatus and a plurality of terminals;
an image forming assembly;
a storage configured to store a plurality of pieces of registration information, wherein at least one piece of registration information comprises:
terminal information indicating two or more terminals from among the plurality of terminals; and
a piece of authentication information corresponding to the terminal information;
an input device configured to input the piece of authentication information;
a processor; and
memory having instructions stored therein that, when executed by the processor, cause the processor to operate as:
an acquisition section configured to acquire the at least one piece of registration information, including the terminal information corresponding to the piece of authentication information inputted by the input device from at least one of the storage of the image forming apparatus and a second storage of the another image forming apparatus;
a controller configured to generate transmission request data for requesting image data, to transmit the generated transmission request data to each of the two or more terminals indicated by the terminal information included in the at least one piece of registration information acquired by the acquisition section, and to control the image forming assembly to form an image on a recording medium based on the image data received in response to the transmission request data;
a determination section configured to determine whether a particular piece of registration information is stored in both the storage of the image forming apparatus and the second storage of the another image forming apparatus; and
a storage management section configured to delete the particular piece of registration information from the storage of the image forming apparatus when the determination section determines that the particular piece of registration information is stored in both the storage of the image forming apparatus and the second storage of the another image forming apparatus.

2. The image forming apparatus according to claim 1, wherein the acquisition section is further configured to acquire a second piece of registration information, corresponding to a second piece of authentication information that is inputted, by the input device of the image forming apparatus from the second storage of the another image forming apparatus, when the second piece of registration information is not stored in the storage of the image forming apparatus.

3. The image forming apparatus according to claim 2, wherein the storage management section is further configured to store the second piece of registration information, acquired from the second storage of the another image forming apparatus, in the storage of the image forming apparatus.

4. The image forming apparatus according to claim 3, wherein the storage management section stores a frequency of use for each of the plurality of pieces of registration information, and wherein the storage management section deletes one of the plurality of pieces of registration information having a lower frequency of use from the storage of the image forming apparatus.

5. The image forming apparatus according to claim 3, wherein when an amount of available storage capacity of the storage of the image forming apparatus is lower than a predetermined amount, the storage management section deletes at least a part of the plurality of pieces of registration information stored in the storage of the image forming apparatus and stores the at least the part of the plurality of pieces of registration information in the second storage having an amount of available storage capacity equal to or greater than the predetermined amount.

6. The image forming apparatus according to claim 5, wherein the storage management section stores a frequency of use for each of the plurality of pieces of registration information, and
wherein the part of the plurality of pieces of registration information includes pieces of registration information having a frequency of use that is lower than a predetermined threshold.

7. The image forming apparatus according to claim 3, wherein the storage management section stores the plurality of pieces of registration information so that each of the pieces of registration information is stored in the storage of the image forming apparatus and the second storage of the another image forming apparatus.

8. The image forming apparatus according to claim 1, wherein the acquisition section is further configured to acquire a second piece of registration information from the another image forming apparatus in an encrypted manner when a corresponding second piece of authentication information is inputted by the input device.

9. The image forming apparatus according to claim 1, wherein the memory comprises further instructions stored therein that, when executed by the processor, cause the processor to operate as:
a group registration section configured to register the image forming apparatus and at least one other image forming apparatus, from among a plurality of other image forming apparatuses, as a group,
wherein the storage of the image forming apparatus stores group information indicating the group registered by the group registration section, and
wherein the acquisition section acquires a second piece of registration information from one of the image forming apparatuses registered in the group based on group information associated with a second piece of authentication information inputted by the input device.

10. The image forming apparatus according to claim 9, wherein the memory comprises further instructions stored therein that, when executed by the processor, cause the processor to operate as:
an update section configured to periodically update the group information stored in the storage of the image forming apparatus to synchronize with group information stored in the image forming apparatuses registered in the group.

11. The image forming apparatus according to claim 10, wherein the update section transmits and receives the group information with the image forming apparatuses registered in the group in an encrypted manner.

12. The image forming apparatus according to claim 1, wherein the generated transmission request data comprises the piece of authentication information included in the at least one piece of registration information acquired by the acquisition section.

13. The image forming apparatus according to claim 1, wherein the two or more terminals indicated by the terminal information includes a terminal that does not store the requested image data.

14. The image forming apparatus according to claim 1, wherein the piece of authentication information relates to a single user.

15. An image forming system comprising:
a plurality of image forming apparatuses; and
a plurality of terminals,
wherein each of the plurality of image forming apparatuses comprises:
a communication interface configured to communicate with another image forming apparatus and the plurality of terminals;
an image forming assembly;
a storage configured to store a plurality of pieces of registration information, wherein at least one piece of registration information comprises:
terminal information indicating two or more terminals from among the plurality of terminals; and
a piece of authentication information corresponding to the terminal information;
an input device configured to input the piece of authentication information;
a first processor; and
memory having instructions stored therein that, when executed by the first processor, cause the first processor to operate as:
an acquisition section configured to acquire the at least one piece of registration information, including the terminal information corresponding to the piece of authentication information inputted by the input device from at least one of the storage of the image forming apparatus and a second storage of the another image forming apparatus;
a controller configured to generate transmission request data for requesting image data and to transmit the generated transmission request data to each of the two or more terminals indicated by the terminal information included in the at least one piece of registration information acquired by the acquisition section, receive the image data from one of the two or more terminals to which the controller transmits the transmission request data, and control the image forming assembly to form an image on a recording medium based on the received image data;
a determination section configured to determine whether a particular piece of registration information is stored in both the storage of the image forming apparatus and the second storage of the another image forming apparatus; and
a storage management section configured to delete the particular piece of registration information from the storage of the image forming apparatus when the determination section determines that the particular piece of registration information is stored in both the storage of the image forming apparatus and the second storage of the another image forming apparatus, and
wherein each of the plurality of terminals comprises:
a terminal communication interface configured to communicate with the plurality of image forming apparatuses;
a terminal input device configured to input a secure print instruction;
a terminal storage;
a second processor; and
memory having instructions stored therein that, when executed by the second processor, cause the second processor to operate as:
a terminal controller configured to store image data to be printed in the terminal storage in response to the secure print instruction inputted in the terminal input device, and to transmit the image data stored in the terminal storage, in response to transmission request data transmitted from a particular image forming apparatus of the plurality of image forming apparatuses, to the particular image forming apparatus.

16. The image forming system according to claim 15, wherein transmission request data transmitted from each of the plurality of image forming apparatuses includes a piece of authentication information inputted by the input device of a respective one of the plurality of image forming apparatuses, and wherein the terminal controller determines whether to transmit the image data stored in the terminal storage, based on the piece of authentication information included in the transmission request data.

17. The image forming system according to claim 15, wherein the two or more terminals indicated by the terminal information includes a terminal that does not store the requested image data.

18. An image forming apparatus communicating with a plurality of terminals, the image forming apparatus comprising:

an image forming assembly;

a storage configured to store a plurality of pieces of registration information, wherein at least one piece of registration information comprises:

terminal information indicating two or more terminals from among the plurality of terminals; and a piece of authentication information corresponding to the terminal information;

an input device configured to input the piece of authentication information;

a processor; and memory having instructions stored therein that, when executed by the processor, cause the processor to operate as:

an acquisition section configured to acquire the at least one piece of registration information including the piece of authentication information inputted by the input device;

a controller configured to generate transmission request data for requesting image data and to transmit the generated transmission request data to each of the two or more terminals indicated by the terminal information corresponding to the piece of authentication information included in the at least one piece of registration information acquired by the acquisition section, receive the image data from one of the two or more terminals to which transmission request data is transmitted, and control the image forming assembly to form an image on a recording medium based on the received image data;

a determination section configured to determine whether a particular piece of registration information is stored in both the storage of the image forming apparatus and the second storage of the another image forming apparatus; and a storage management section configured to delete the particular piece of registration information from the storage of the image forming apparatus when the determination section determines that the particular piece of registration information is stored in both the storage of the image forming apparatus and the second storage of the another image forming apparatus.

19. The image forming apparatus according to claim 18, wherein the two or more terminals indicated by the terminal information includes a terminal that does not store the requested image data.

* * * * *